Aug. 22, 1950     C. G. NEWLAND     2,520,051
AUTOMOBILE RACK
Filed June 21, 1948
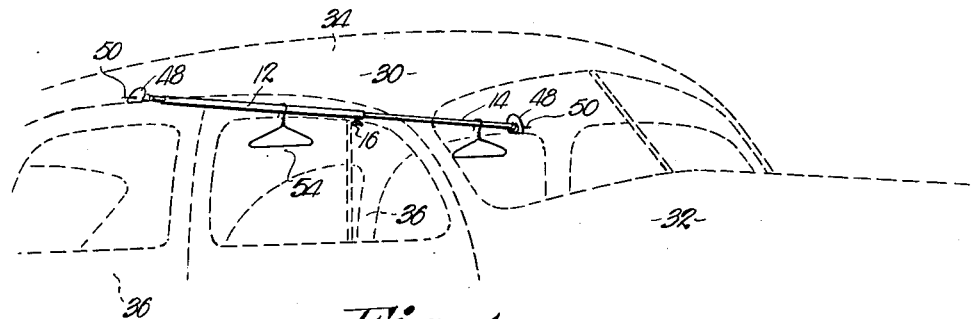
Fig. 1.
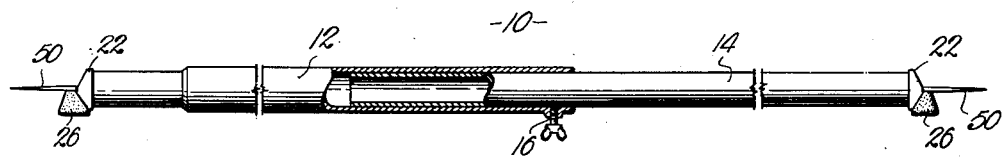
Fig. 2.
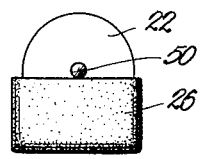
Fig. 4.
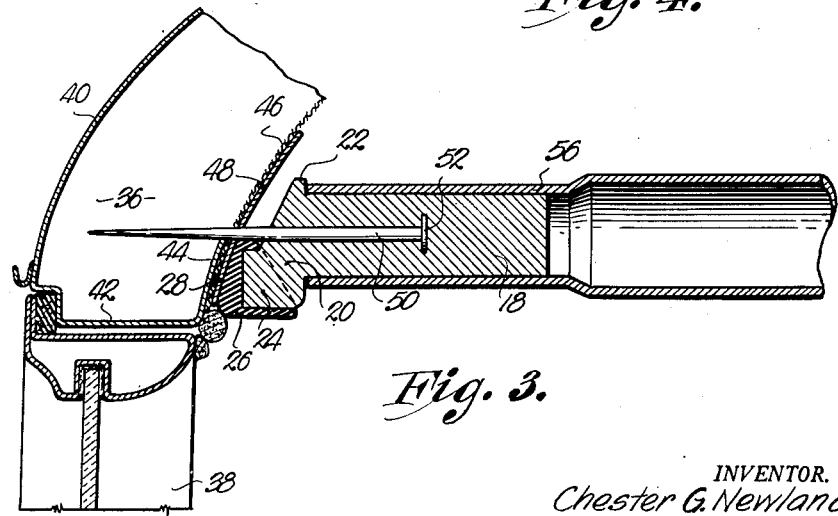
Fig. 3.
INVENTOR.
Chester G. Newland
BY
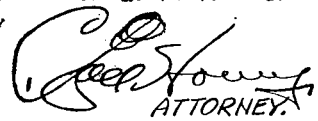
ATTORNEY.

Patented Aug. 22, 1950

2,520,051

UNITED STATES PATENT OFFICE 2,520,051

AUTOMOBILE RACK

Chester G. Newland, Kansas City, Kans.

Application June 21, 1948, Serial No. 34,202

1 Claim. (Cl. 224—42.1)

This invention has to do with accessories for automobiles and the like and more particularly to a rack adapted for disposition within an automobile body between a pair of opposed side walls thereof for receiving articles to be carried by the automobile such as clothing disposed on a conventional hanger.

The most important object of this invention is the provision of an automobile rack constituting an elongated extensible member provided with means intermediate the ends thereof for holding the same in an extended position with its ends abutting tightly the innermost walls of the automobile body.

Another important object of this invention is to provide an automobile rack having a pair of relatively telescoped tubular members shiftable to and from an extended position with the ends thereof abutting opposed innermost side walls of an automobile body, the ends having relatively sharp piercing members adapted to pass through said walls for holding the rack against displacement.

A further object of this invention is to provide a rack as above described having resilient bumpers or the like at the ends thereof bearing against the proximal walls of the automobile body for further holding the rack tightly in place and to compensate for vibration of the automobile.

Other objects of this invention include the way in which the upholstery of the body is protected against damage from the rack; the manner in which the body-piercing pins are formed integrally with a part of the rack; and the way in which releasable means is provided for holding the tubular members in an extended position.

Other objects will be made clear or become apparent as the following specification progresses, reference being had to the accompanying drawing, wherein:

Fig. 1 is a perspective view of a rack for automobiles made in accordance with the present invention showing the same in an operative position within an automobile body.

Fig. 2 is a side elevational view thereof, parts being broken away to reveal details of construction.

Fig. 3 is an enlarged fragmentary substantially central cross sectional view through the rack showing the same operatively mounted within a portion of the automobile body, the latter also being in section; and Fig. 4 is an elevational view of the rack.

An ever present problem in present day automobiles is the provision of means within the body thereof for effectively and simply hanging articles of clothing such as coats and other items of wearing apparel. Hooks have been provided adjacent the side walls of the body together with means on the side windows thereof such as suction cups and hooks that loop over the uppermost edge of the glass, but in all of such devices the inherent difficulty still exists of maintaining the wearing apparel in a neat condition while the same is so hung. Through use of the device about to be described however, and because of its particular adaptability of positioning where the wearing apparel can hang in its entire length without interference by any part of the body interior, all of the aforesaid difficulties are overcome.

The hanger per se and illustrated in its entirety in Fig. 2 of the drawing, is broadly designated by the numeral 10 and constitutes an extensible, elongated sectional member, there being a pair of sections 12 and 14. These sections 12 and 14 are preferably tubular as shown and relatively telescoped whereby the section 14 is freely slidable within the section 12 and extends beyond one end thereof.

A wing-nut type set screw 16 passes through the section 12 near one end thereof adjacent the section 14 and bears against the outermost face of the section 14 for holding the two sections 12 and 14 in any desired position and against relative sliding and rotative movement. The outermost free ends of each of the sections 12 and 14 are provided a solid plug 18 of identical characters and, therefore, only one will be described.

This plug 18, as shown in Fig. 3 of the drawing, extends inwardly a distance into the respective section 12 or 14 as the case may be and is provided with a relatively large head 20 that is disposed exteriorly of the member 10. Head 20 is provided with an out-turned annular flange 22 having a diameter greater than the outside diameter of the proximal section 12 or 14 and abuts the respective end of the member 10.

Any suitable means for holding this plug 18 in place may be used such as a tight press fit, but when the member is placed in use, it will be readily apparent that there is little need for an extremely tight interconnection between the plugs 18 and the member 10.

Head 20 is provided with a portion 24 that extends laterally outwardly and downwardly from the member 10, this portion 24 being polygonal in cross section and having a resilient cap 26 made from rubber or the like almost completely covering the same. The outermost face 28 of this cap 26 is slightly curved to conform with the interior of body 30 of an automobile broadly designated by the numeral 32 for reasons hereinafter made clear.

The usual present day automobile body is provided with an arcuate top 34 that extends downwardly and merges into a pair of side walls 36 within which are mounted doors 38. Said arcuate top 34 of the automobile body 30 has an outermost panel 40 that extends horizontally as at 42 adjacent the lowermost edge thereof and directly above the uppermost edge of the doors 38 or windows as the case may be. From this horizontal portion 42, shell 40 extends upwardly into a flange 44 that is spaced from and substantially parallel to the outermost wall of shell 40. It is to the innermost face of this up-turned flange 44 that upholstery 46 for the automobile body 30 is affixed.

When the member 10 is placed in use in the manner illustrated in Fig. 1 of the drawing, the rubber bumpers 26 are in alignment with the respective flange 44 of walls 36. Before so placing the member 10 in position, a protecting pad 48 for the upholstery 46 is placed over the latter and secured thereto by adhesive or other fastening means. The bumpers 26 bear directly against such pad 48 and are held against movement toward the shell 40 of body 30 by the rigidity of up-turned flange 44.

Each of the inserts or plugs 18 has embedded therein an elongated pin 50 having a head 52 thereon for holding the same in place. Said pin 50 has its outermost free end extending beyond the plug 18 and said end is sharped to the end that the same may be forced through the pad 48 into the space between shell 40 and upholstery 46 as clearly indicated in Fig. 3. Pin 50 is disposed directly above the uppermost edge of bumper 26 as shown in Figs. 3 and 4 and when in place secured to the body 30 of automobile 32, this pin 50 rests directly upon the uppermost edge of the up-turned flange 44. These pins 50, therefore, serve to support the weight of articles of clothing or other items to be hung upon the member 10 by use of conventional hangers or the like 54.

Lateral displacement of the member 10 is prevented by the sections 12 and 14 being extended to a positon where the same is wedged tightly between the opposed flanges 44 and since the bumpers 26 yieldably hold member 10 in such tightly wedged condition, there is no danger of displacement of the member 10 in any direction within body 30 regardless of the extent of vibration within the automobile 32. With the set screw 16 loosened, it is a simple matter to move the member 10 into place within the body 30 at any position desired. It is contemplated however, that the member 10 be placed directly above the rear doors 38 of the automobile 32 or above the glass behind the front seat of the automobile in the event that the same has but two doors. With member 10 so disposed, garments hanging upon the members 54 will extend downwardly behind the front seat of automobile 32 and have sufficient clearance above the automobile floorboard to accommodate the longest of coats and other wearing apparel.

As illustrated in Fig. 3 of the drawing, the outermost free end of the section 12 of member 10 is provided with a portion 56 of reduced diameter, said portion 56 having an inside diameter substantially the same as the inside diameter of the entire section 14 to the end that the two plugs 18 be of identical character.

Manifestly it is not desired to be limited to the precise construction of the single embodiment of the invention herein shown and described and it is contemplated that the sections 12 and 14 might well be made in a number of different manners other than relatively telescoped tubular sections while still maintaining the broad principle of extensibility. Accordingly, it is desired to be limited only by the spirit of this invention as defined by the scope of the appended claim.

Having thus described the invention, what is claimed as new and desired to be secured by Letters Patent is:

A rack for automobiles having a body provided with opposed, fabric side walls, each having a rigid backing plate provided with a substantially horizontal, uppermost edge, said rack comprising an elongated extensible member including a pair of tubes, one of said tubes being slidably telescoped within the other; a plug extending into the outermost end of each tube respectively, each plug having an enlarged head on the outermost end thereof, each head having an extension; a resilient bumper on each extension respectively; means for holding said tubes against relative sliding movement with said bumpers in tight, abutting engagement with proximal side walls adjacent said backing plate thereof, each head having the outermost end thereof, exclusive of its extension, spaced from the proximal wall; and a piercing element mounted in each plug respectively and extending outwardly from the corresponding face above adjacent bumpers, said elements being adapted to pass through said fabric and rest upon said uppermost edge of proximal backing plates when the bumpers are in engagement with said side walls.

CHESTER G. NEWLAND.

REFERENCES CITED

The following references are of record in the file of this patent:

UNITED STATES PATENTS

| Number | Name | Date |
|---|---|---|
| 1,299,556 | Crecelius | Apr. 8, 1919 |
| 1,726,257 | Carlisle | Aug. 27, 1929 |
| 2,031,461 | Chambless | Feb. 18, 1936 |
| 2,253,473 | Fellers et al. | Aug. 19, 1941 |
| 2,293,168 | Pirone | Aug. 18, 1942 |